US009032598B2

(12) United States Patent
Eldar

(10) Patent No.: US 9,032,598 B2
(45) Date of Patent: May 19, 2015

(54) HAND TOOL FOR INSERTING A VARIETY OF CONNECTORS INTO PLASTIC IRRIGATION PIPING

(76) Inventor: Mordechai Eldar, Or Yehuda (IL)

( * ) Notice: Subject to any disclaimer, the term of this patent is extended or adjusted under 35 U.S.C. 154(b) by 484 days.

(21) Appl. No.: 13/555,324

(22) Filed: Jul. 23, 2012

(65) Prior Publication Data

US 2013/0047389 A1 Feb. 28, 2013

(30) Foreign Application Priority Data

Aug. 24, 2011 (IL) .......................................... 214811

(51) Int. Cl.
*B23P 19/04* (2006.01)
*B25B 27/10* (2006.01)

(52) U.S. Cl.
CPC ...................................... *B25B 27/10* (2013.01)

(58) Field of Classification Search
CPC .... B21D 39/04; B21D 39/046; B23P 19/061; B25B 27/10
USPC ........ 29/237, 280, 525, 890.15; 269/3, 6, 107
See application file for complete search history.

(56) References Cited

U.S. PATENT DOCUMENTS

| | | | | |
|---|---|---|---|---|
| 5,271,257 | A * | 12/1993 | Irwin | 72/316 |
| 5,398,394 | A * | 3/1995 | Hyatt et al. | 29/237 |
| 5,483,731 | A * | 1/1996 | Prendel et al. | 29/237 |
| 5,513,425 | A * | 5/1996 | Williams | 29/237 |
| 5,537,727 | A * | 7/1996 | Mayer | 29/237 |
| 5,592,726 | A * | 1/1997 | Suresh | 29/237 |
| 5,671,520 | A * | 9/1997 | Scarborough | 29/237 |
| 5,694,670 | A * | 12/1997 | Hosseinian et al. | 29/237 |
| 5,743,131 | A * | 4/1998 | Holliday et al. | 72/409.1 |
| 5,979,032 | A * | 11/1999 | Roy et al. | 29/237 |
| 6,658,711 | B1 * | 12/2003 | Benson | 29/237 |
| 6,948,222 | B1 * | 9/2005 | Greer et al. | 29/235 |
| 7,275,293 | B2 * | 10/2007 | Wathey | 29/237 |
| 7,322,085 | B1 * | 1/2008 | Benson | 29/237 |
| 7,421,768 | B2 * | 9/2008 | Chiang | 29/237 |
| 7,665,718 | B1 * | 2/2010 | Benson | 269/237 |
| 7,823,271 | B2 * | 11/2010 | Xie et al. | 29/751 |
| 8,132,323 | B2 * | 3/2012 | Rodrigues | 29/861 |
| 8,341,816 | B1 * | 1/2013 | Swinford | 29/237 |
| 8,356,402 | B2 * | 1/2013 | Xie et al. | 29/751 |
| 8,534,651 | B2 * | 9/2013 | Scapa et al. | 269/49 |
| 8,615,863 | B1 * | 12/2013 | Hope | 29/283.5 |

(Continued)

FOREIGN PATENT DOCUMENTS

| | | |
|---|---|---|
| IL | 111737 | 11/1994 |
| IL | 152089 | 10/2002 |

*Primary Examiner* — Lee D Wilson
*Assistant Examiner* — Jamal Daniel
(74) *Attorney, Agent, or Firm* — Ostrolenk Faber LLP

(57) ABSTRACT

A hand tool for inserting a large variety of connector components into narrow plastic irrigation piping is disclosed. This tool is an improved and progressive development of my previous Israeli patent no: 152089 in that it is designed to work with a large variety of connector components and is designed to accommodate both sizes of narrow spaghetti piping, whereas the previous patent could accommodate only a single size of narrow piping.

The tool as shown in FIG. 2 has a body onto which all the elements are connected and the body is configured to sit comfortably in the palm of the hand. When pressing down on the handle, the grips secure the narrow piping and cause a connector component, deployed in appropriate recess provided in the tool to be easily inserted into the narrow piping.

20 Claims, 8 Drawing Sheets

(56) References Cited

U.S. PATENT DOCUMENTS

| | | | | |
|---|---|---|---|---|
| 8,756,780 | B2 * | 6/2014 | Maunder | 29/280 |
| 2005/0166331 | A1 * | 8/2005 | Eldar | 7/157 |
| 2006/0288552 | A1 * | 12/2006 | Roll et al. | 29/237 |
| 2007/0209204 | A1 * | 9/2007 | Chase et al. | 29/890.144 |
| 2009/0260216 | A1 * | 10/2009 | Avnon | 29/525 |
| 2009/0300917 | A1 * | 12/2009 | Hwang | 29/890.15 |
| 2010/0088869 | A1 * | 4/2010 | Webb et al. | 29/237 |
| 2011/0167612 | A1 * | 7/2011 | Marshall | 29/428 |
| 2013/0047389 | A1 * | 2/2013 | Eldar | 29/237 |
| 2013/0093184 | A1 * | 4/2013 | Peirce | 285/323 |
| 2013/0167343 | A1 * | 7/2013 | Goulet et al. | 29/237 |
| 2014/0020225 | A1 * | 1/2014 | Raczuk | 29/428 |

* cited by examiner

HAND TOOL FOR INSERTING A VARIETY OF CONNECTORS INTO PLASTIC IRRIGATION PIPING

BACKGROUND OF THE INVENTION

In the irrigation industry in agriculture and gardening there is widespread use of plastic piping made of polyethylene. From the main large pipeline exit subsidery piping of smaller diameters of 5 or 7 mm and more. At one extremity of the subsidery piping there is a dripper element, and at the other extremity a connector component that connects the subsidiary piping to the main pipeline. Additionally there can be other subsidiary piping connected with a T shaped component. In FIG. 1 one can see examples of dripper elements and connectors used in plastic piping. The insertion of the dripper and of the connector component into plastic piping is a difficult and uncomfortable procedure. Therefore there is the need for a hand tool to facilitate this operation. The tools at present available for this insertion operation are limited in that each size of piping requires a separate tool. These previous Israeli patents, no 111737, of 23 Nov. 1994, and no. 152089, of 2 Oct. 2002, (both under my name) describe such tools. In the present invention the insertion operation can be performed by the same tool but with piping having two diameters, 5 mm and 7 mm, or on piping with similar diameters.

All the parts of the tool are manufactured from plastic materials, apart from the springs, pins and screws that are made from metal. The tool of the present invention should be seen as an immense versatile improvement on previous inventions and therefore we are requesting a patent thereon.

BRIEF DESCRIPTION OF THE TOOL PARTS AND THEIR FUNCTION

1 TOOL BODY—main part of the tool on which all other parts are connected.

2 HANDLE—operation of this handle causes it to push down on the pushing element head.

3 PUSHING ELEMENT HEAD—closes the grips and pushes the inserter head in the direction of the piping.

4 INSERTER HEAD—accommodates the different dripper elements which are to be inserted into the piping.

5 GRIPS—holds the piping to allow for elements to be inserted.

6 FORWARD FLANGE—prevents the screws from moving sideways.

7 HOLDING PIN—hold the handle such that it can swivel with respect to the body of the tool.

8 PUSHING ELEMENT PIN—lower extremity of inserter head whose sharp shape allows it to penetrate between the grips.

9 HOLDING SCREW—screw that holds the inserter head secured to the body of the tool.

10 CLOSING HANDLES—enlarges or makes smaller the opening of the grips to accommodate the two different sized piping.

11 PUSHING ELEMENT SPRING—returns the pushing element to its original position after release of the handle at the end of the operation of the tool.

13 PIPING—piping with diameter of 5 or 7 mm into which is inserted a dripper element.

14 INSERTER HEAD SPRING—returns the inserter head to its' position.

15 CLOSING HANDLE PIN—holds the closing handle.

17 GRIPS SPRING—causes the grips to open.

19 BOTTOM SCREWS—hold the grips to the body.

21 INSERTER HEAD COVER—additional part that sits on the inserter head allowing use of great range of dripper elements.

The accompanying drawings, which are incorporated in and form a part of the specification, illustrate preferred embodiments of the invention and together with the description, serve to explain the principles of the invention.

DETAILED DESCRIPTION OF THE INVENTION

Figure 1:
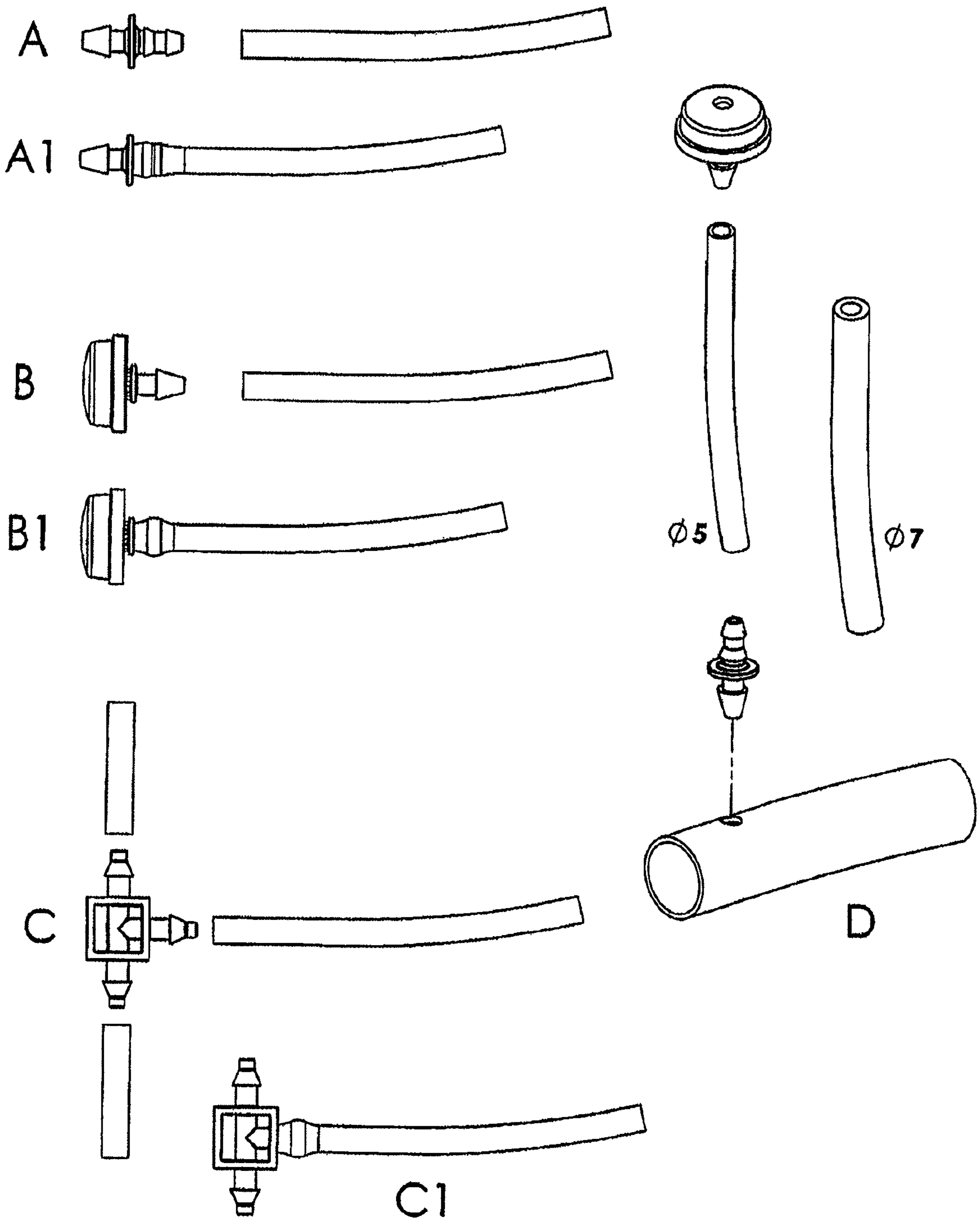
FIG. 1: Examples of plastic piping and dripping elements and connectors.
Figure 2:
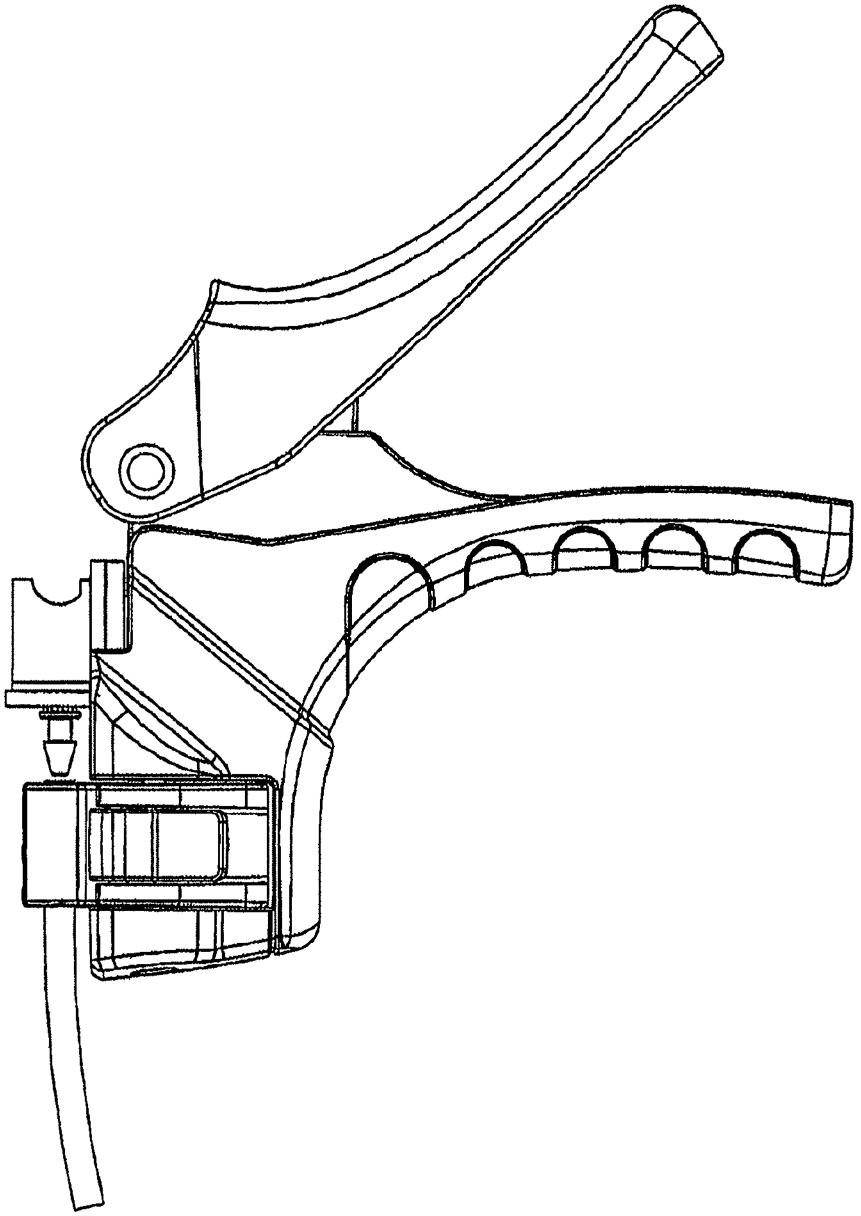
FIG. 2: General front view of the tool with piping held by the tool in position ready for insertion thereinto of a dripper or a connector.
Figure 3:
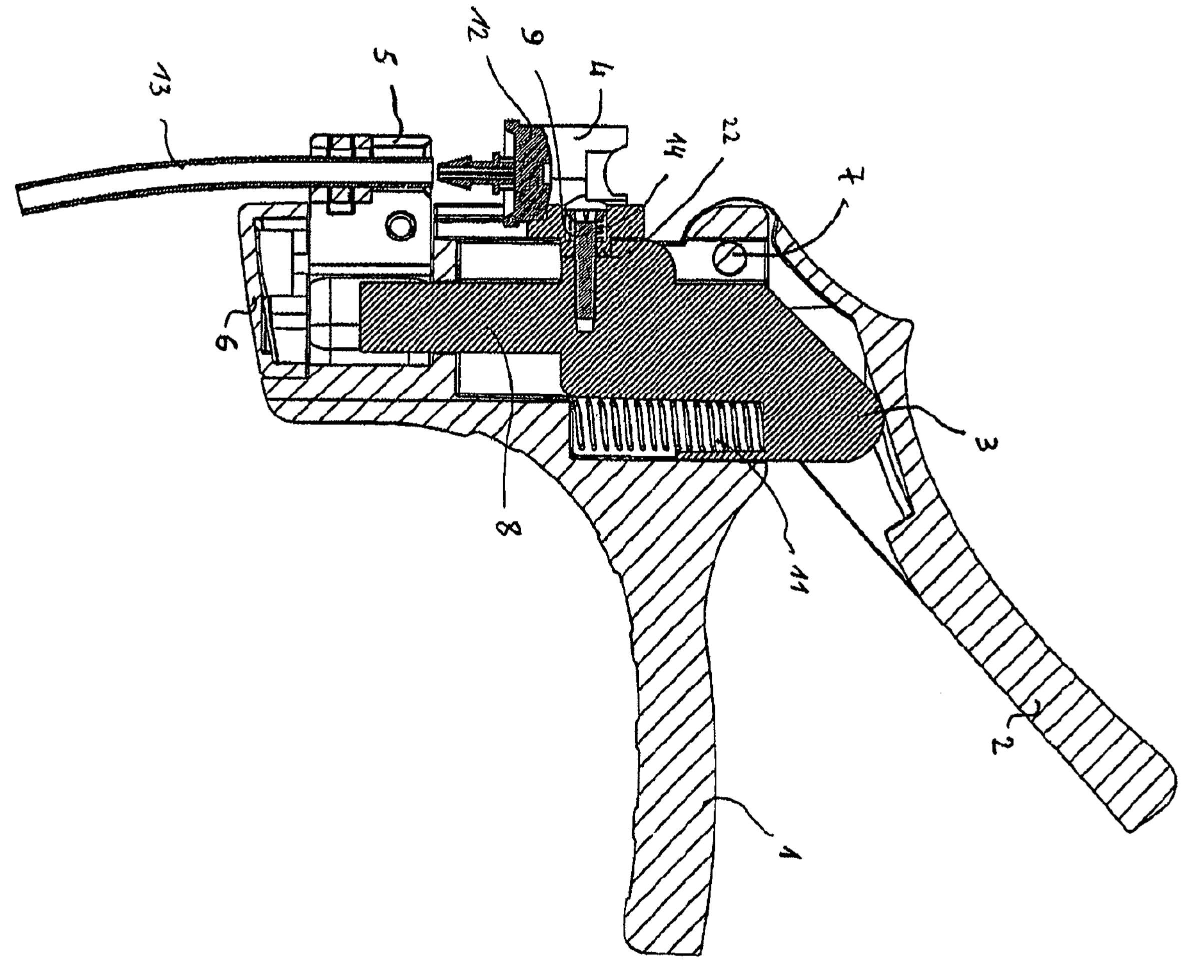
FIG. 3: Cross sectional view of the tool with all the parts when the handle is not pressed and the tool is in open position.
Figure 4:
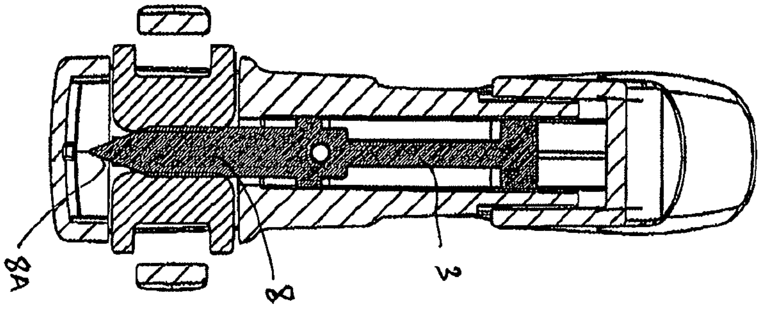
FIG. 4: Cross sectional view of the tool with all the parts when the handle is pressed and the tool is in closed position.
Figure 4:
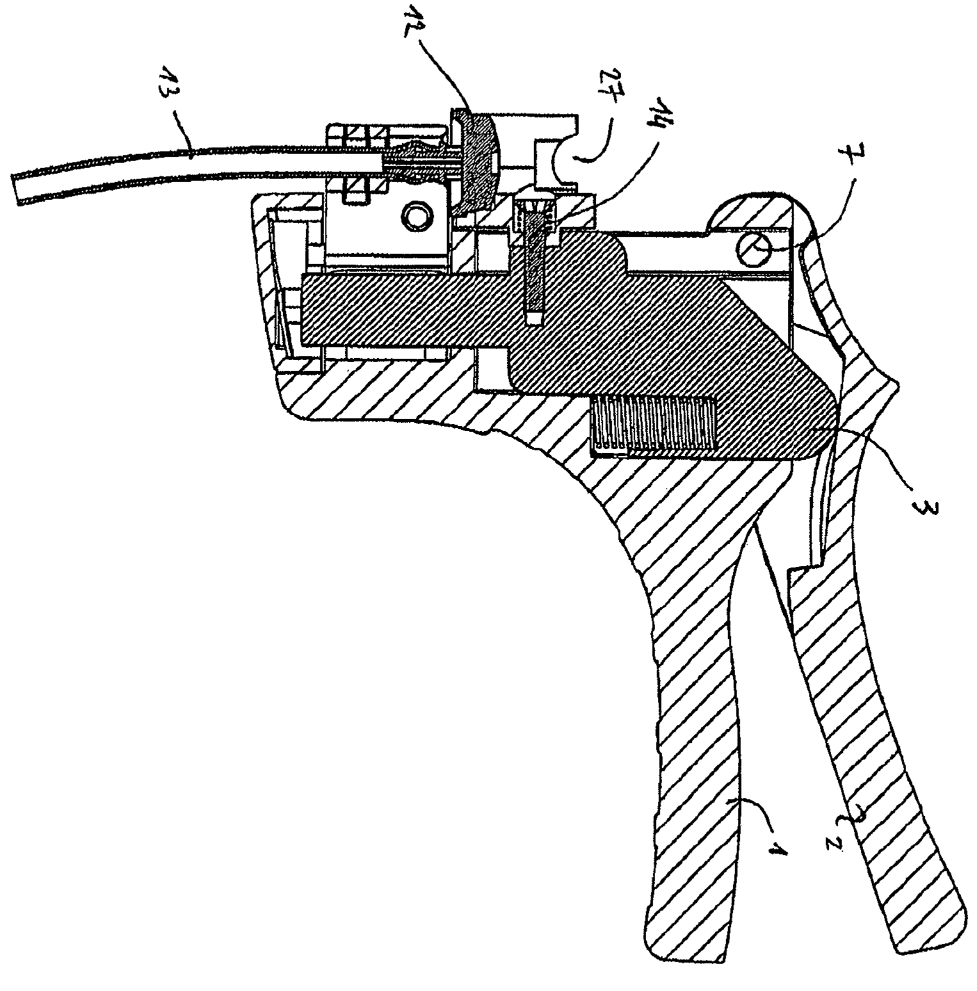

As can be seen in FIGS. 2, 3 and 4 pressure on a handle (2) designated by an arrow creates a lever action that presses on the pushing element head (3) and by this action two elements become activated, one a couple of grips (5) with the help of the pushing pin (8) that at its' extremity (8*a*) is narrow. The second activated element being the inserting head (4) that is forcibly displaced forward and pushes on the dripper element (A) or any other dripper element (A, B, C) as seen in FIG. 1. The dripper element is pushed in the direction of the piping (13) and penetrates into it. The piping is secured between grips (5). The result can be seen in FIG. 4, the required dripper element (A, or B, or C) upon displacing forward penetrates the piping (13) having diameter 5/3 or diameter 7/4.

The inserting head (4) is preferably square shaped with holes on its sides thus having different shapes to accommodate and store different dripper elements to be penetrated into piping e.g. round holes to suit various round shaped elements.

Figure 8:
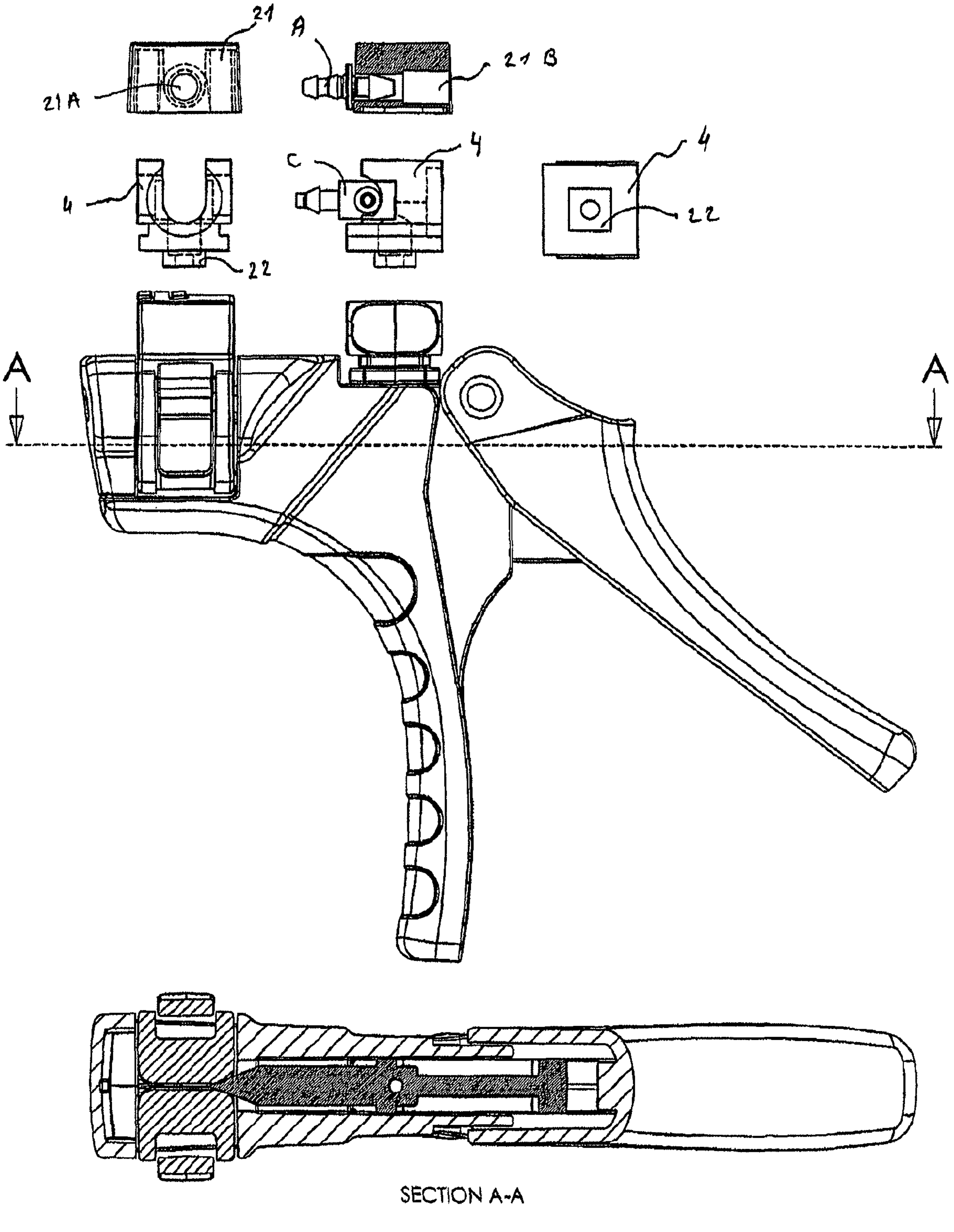
FIG. 8: Side view of the tool and cross sectional view of the pushing element.

Additionally in FIG. 4 is shown that a U-shaped opening (27) can be provided in the inserting head for inserting T-shaped dripper elements, that can be seen in FIG. 1C, C1 and in FIG. 8C.

The inserting head (4) can be indexed in four positions with the help of a protrusion (22) which can lift against spring (14) which is under a screw (9) that connects the inserting head (4) to the pushing element (3).

Figure 6:
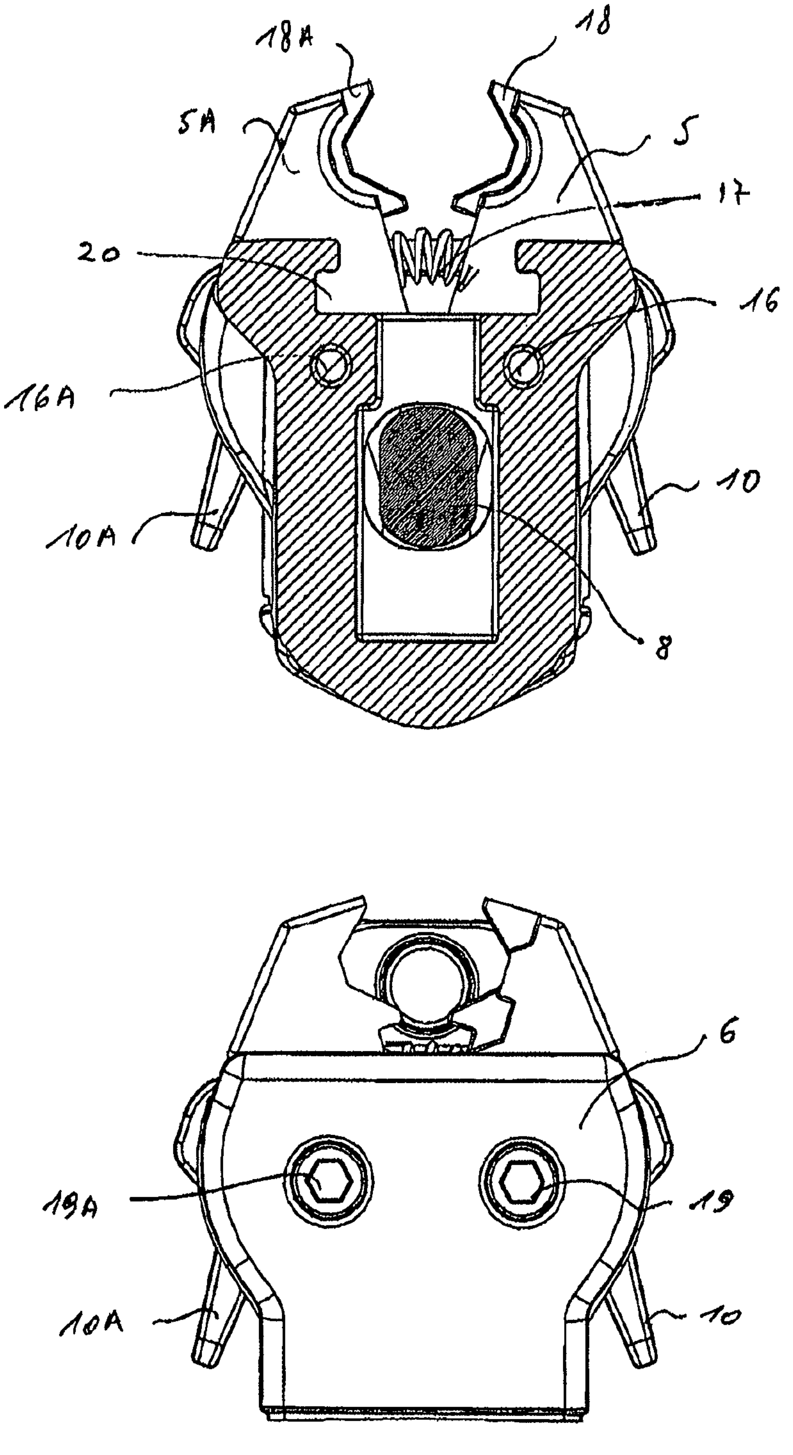
FIG. 6: Cross sectional view of frontal flange.

While pressing on the handle (2) the inserting head (4) enters the T-shaped track (20), shown in FIG. 6, that ensures its steady location in correct position during displacement forward towards the piping.

In order to allow use of a large variety of dripper elements the inserter head has a cover (21) with different sized holes (21*a*+21*b*). This cover can be indexed in 2 positions or 4 positions as required.

As seen in FIG. 6 the grips (5+5*a*) are connected to the tool body (1) with possibility for pivoting with respect to the body (1) since they are secured by screws (19+19*a*) which are in fact axes about which the grips pivot. The screws are inserted into the holes (16+16*a*) that are made in the grips (5+5*a*), and while the screws are tightened to the body the grips have freedom of pivotal movement sideways.

While the tool is in operation, i.e. when the handle is pressed, the pushing element pin (8) penetrates between the grips (5+5*a*) and its narrowing end causes the grips to pivot such that they close and hold the piping (13) between the grips jaws (18+18*a*). The spring (17) that is situated between the grips (5+5*a*) returns them to their original position upon completion of the operation and when the handle is released. In order to cause the grips to hold piping (13) of smaller diameter, the tool is provided with two levers, or closing handles (10+10*a*) which can pivot about steel pins (15+15*a*), passing through bores (15*b*, 15*c*) made in the levers. In the further disclosure the closing handles will be referred-to as levers.

Figure 5:
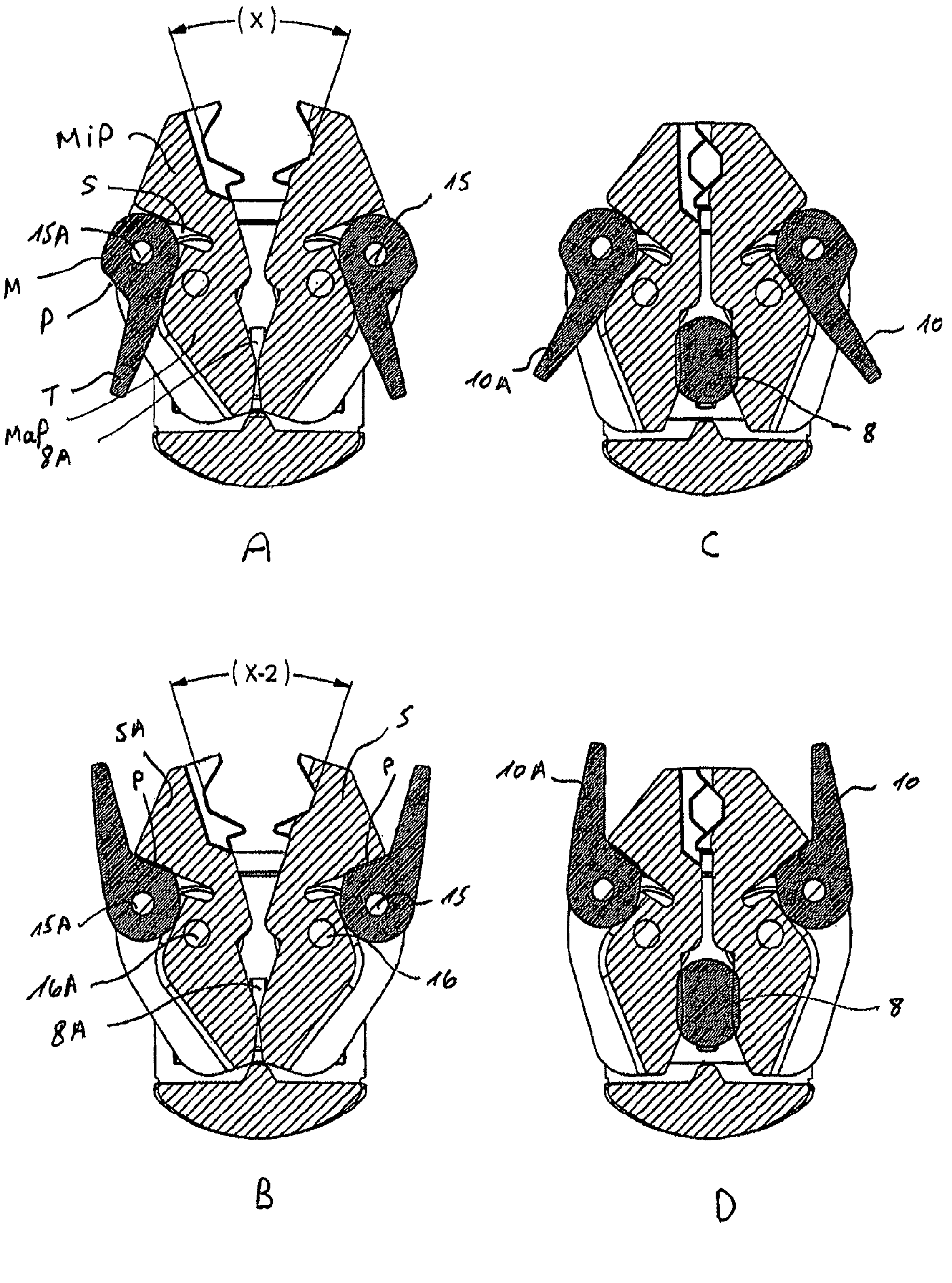
FIG. 5: Cross sectional view of the grips and closing handles.
Figure 7:
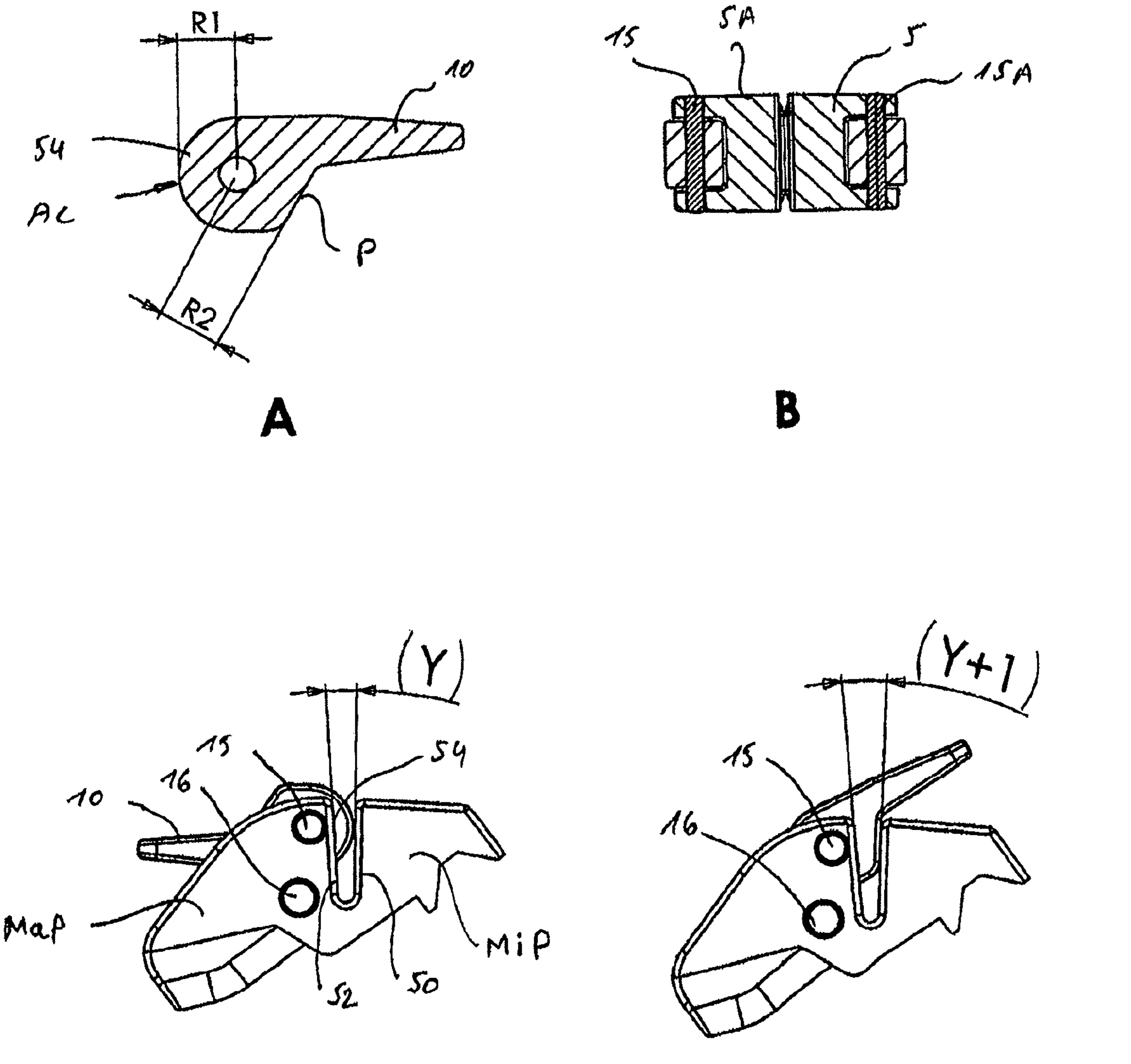
FIG. 7: Cross sectional view of the closing handle and grips.

With reference to FIG. 7A and FIG. 5A the levers are provided with a tail portion T (it is designated as 10 in FIG. 7A) for holding, by a head portion H, which has an arched contour AC, defined by a non constant radius of curvature, and by a planar portion P.

To bring the grips in the closed position in which they secure the piping (13) the levers are held by hand and turned towards respective grip either clockwise or anticlockwise until respective planar portions of the levers press down on the grips (5+5*a*). As seen in FIG. 5A and 7C the grips are provided with a major portion MaP and with a minor portion MiP, which are separated from each other by a slot S. The slot has a width, delimited by two opposite planar sides 50, 52. By virtue of this provision elastic bending of the minor portion of the grip with respect to the major portion is possible when pressure is exerted on planar side 50 by a lever. It could be appreciated that the grips can be brought closer to each other when pressure is applied to each grip by respective planar portion of a lever associated with each grip.

As seen in FIG. 5A the arched contour AC has a circular portion 54 defined by a first curvature radius R1. This portion conjugates with a curved portion 56 having a second curvature radius R2. The radii R1 and R2 are selected in such a manner that when a lever is turned it first freely rotates and the circular portion 54 exerts no pressure on the planar side 50 of the slot. However upon still further turning of the lever when the second curved portion comes in contact with the side 50 it exerts pressure on it because radius of curvature of this portion is larger than of the first portion.

This pressure increases the slot width and elastically bends the minor portion of the grip such that it is displaced towards the opposite grip. As soon as the lever is turned in such extent that the entire second curved portion is passed, the planar portion P of the lever is brought in contact with the planar side 50 of the slot. The lever remains locked in this position until pressure is exerted on the lever in order to turn it in reverse direction and to release the grip.

Referring to FIGS. 7*c* and 7*d* the increase of the slot width due to pressure exerted on one of the slot sides is shown. The initial slot width is designated as Y in FIG. 7*c* and it refers to a situation when lever 10 is not yet turned. In FIG. 7*d* is seen a situation when lever 10 is turned until its planar portion P is brought in contact with the side 50 of the slot. In this position the slot has increased width, designated Y+1 which is by 1 mm wider than the width Y.

Thus with reference to FIG. 5A it is seen a situation when the levers are in initial positions and the grips are separated from each other by a distance X. The handle is not pressed yet.

In FIG. 5B is seen the situation after the levers have been turned and locked in a position where the grips approach each other and are separated by a smaller distance X−2. The handle is not pressed yet.

In FIG. 5C is shown a situation when the grips are brought to each other by pressing the handle, while the levers are left in an open position. A piping of larger diameter can be secured between the grips.

In FIG. 5D is shown a situation after the handle has been pressed and after the levers were turned to lock the grips in a position where piping of smaller diameter can be secured between the grips.

Description of the Operation of the Grips and Closing Handles

The grips (5+5*a*) sit on axis (16+16*a*) and are capable to pivot in a closed position and in an open position. The grips (5+5*a*) closing movement causes the piping (13) of a larger diameter, already placed in position in the tool, to be secured between the grips. The grips (5+5*a*) opening movement causes the piping (13) to be released. For securing piping of smaller diameter the grips (5+5*a*) closing movement can be carried out in two steps. The first step when the grips (5+5*a*) are open and the piping (13) is situated between them, by pressing on the handle (2) we cause the grips (5+5*a*) to pivot and close towards each other, thanks to the pushing element (8*a*) that has a narrowing end. The second step is done by pivoting levers (10*a*, 10*b*), which brings the grips closer and eventually locking the grips (5+5*a*) in the closed position. This operation is caused by the following: each of the grips (5+5*a*) has a slot dividing the grip in two portions and imparting ability for elastic bending of one of the portions upon exerting pressure on one side of the slot. When bendable portions of both grips are elastically bent the distance separating between the grips diminishes such that piping of smaller diameter can be secured between them.

Each lever (10+10*a*) has a holding tail portion (10*b*, 10*c*) which serves for grasping and a head portion (10*d*, 10*e*) which has curved contour, causing elastic bending of the grips such that the grips approach each other and when the planar portions of each lever are brought in contact with respective planar sides of each slot the levers remain locked in this position. By virtue of this provision the piping of smaller diameter is secured between the grips.

At the conclusion of the insertion action the handle (2) is released and returns to its' initial position, and is pushed by the spring (11). The spring (17) distances the grips (5+5*a*) from each other. Thus the piping (13) can be released.

The invention claimed is:

1. A hand tool for inserting a selected dripper element or connector into plastic piping having various outside diameter, said tool comprising:

a tool body to which a handle is connected, said handle is capable of pivoting between an upward position and a downward position with respect to the body in response to a pressure exerted on the handle, a pushing element mounted within the tool body with possibility for reciprocate movement in response to the pivoting of the handle, said reciprocate movement is associated either with a) fixation the plastic piping in a ready position vis-a-vis the selected dripper element or connector, followed by b) forcible displacement the selected dripper element or connector towards the plastic piping and c) inserting the selected dripper element or connector into the plastic piping or with d) releasing the plastic piping from the ready position, a couple of grips, capable to be pivotably displaced with respect to the tool body when said pushing element is forced by the handle to do reciprocate movement, said grips are pivotably displaceable from an open position, in which the plastic piping can be either placed between the grips or evacuated therefrom and a closed position, in which the fixation of said plastic piping in the ready position is effected, a first spring means, which is capable to resist the pressure exerted on the handle and to return the handle into the upward position when the exerted pressure is released from the handle, a second spring means, which is capable to keep the grips in the open position and to resist to their pivotable displacement into the closed position, a couple of levers co-operating with said grips, said levers are pivotably displaceable from an open position to a closed position, the arrangement being such that when the grips are in the closed position and the levers are in the open position it is possible to effect fixation of the plastic piping having a first outside diameter, and when the grips are in the closed position and the levers are in the closed position it is possible to effect fixation of the plastic piping having a second outside diameter.

2. The hand tool as defined in claim 1, comprising a holder means for holding the selected dripper element or connector, said holder means is displaceable by said pushing element between a ready position, in which the selected dripper element or connector is vis-à-vis the plastic piping and an insertion position, in which the selected dripper element or connector is being inserted in the plastic piping.

3. The hand tool as defined in claim 2, in which said holder means is indexable with respect to the tool body.

4. The hand tool as defined in claim 2, in which said holder means is provided with a plurality of holes configured and dimensioned in accordance with a dripper element or connector to be held.

5. The hand tool as defined in claim 2, comprising a guiding slot made in the tool body for guiding the holder means during its displacement between the ready position and the insertion position.

6. The hand tool as defined in claim 5, in which said guiding slot has a T-shaped cross-sectional configuration.

7. The hand tool as defined in claim 2, comprising a removable cover for covering the holder means.

8. The hand tool as defined in claim 1, in which said pushing element is provided with an extremity, configured and shaped so as to penetrate between the grips or to remove therefrom upon movement of the pushing element.

9. The hand tool as defined in claim 8, wherein upon exerting the pressure on the handle said pushing element is displaced in a forward direction, in which said extremity penetrates between the grips, while causing their displacement in the open position and upon releasing the pressure said extremity removes from the grips, while causing their displacement in the open position.

10. The hand tool as defined in claim 1, in which each of said levers is provided with a tail portion and with a head portion, said tail portion is conveniently accessible for bringing a lever from the open position to the closed position and vice versa, the arrangement being such that when the levers are brought in the closed position the head portion of a lever exerts pressure on a respective grip, co-operating with this lever, such that when the grips are brought in the closed position the fixation of the plastic piping of the second outside diameter is possible.

11. The hand tool as defined in claim 10, in which the second outside diameter is less than the first outside diameter.

12. The hand tool as defined in claim 11, in which said first outside diameter is 7 mm and said second outside diameter is 5 mm.

13. The hand tool as defined in claim 10, in which a distance between the grips, when they are in the closed position and the levers are in the open position is 7 mm.

14. The hand tool as defined in claim 10, in which a distance between the grips when they are in the closed position and the levers are in the closed position is 5 mm.

15. The hand tool as defined in claim 10, in which each of said grips is provided with a slot dividing a grip into a major portion and a minor portion, the arrangement being such that bringing of levers into closed position is associated with elastic displacement of their respective minor portions such that in the closed position the minor portions of the grips approach each other.

16. The hand tool as defined in claim 10, in which said head portion has a curvilinear configuration defined by a non constant radius of curvature.

17. The hand tool as defined in claim 10, in which each of said levers is provided with a planar region disposed between the tail portion and the head portion.

18. The hand tool as defined in claim 1, in which said levers are bearing indicia on their respective tail portions.

19. The hand tool as defined in claim 18, in which said indicia indicate an outside diameter of the plastic piping.

20. The hand tool as defined in claim 1, said tool is made of a plastic material.

* * * * *